April 14, 1953
J. L. WOOLLING
2,634,552
TAKE-OUT DEVICE FOR GLASS BLOWING MACHINES
Filed Jan. 10, 1949
2 SHEETS—SHEET 2
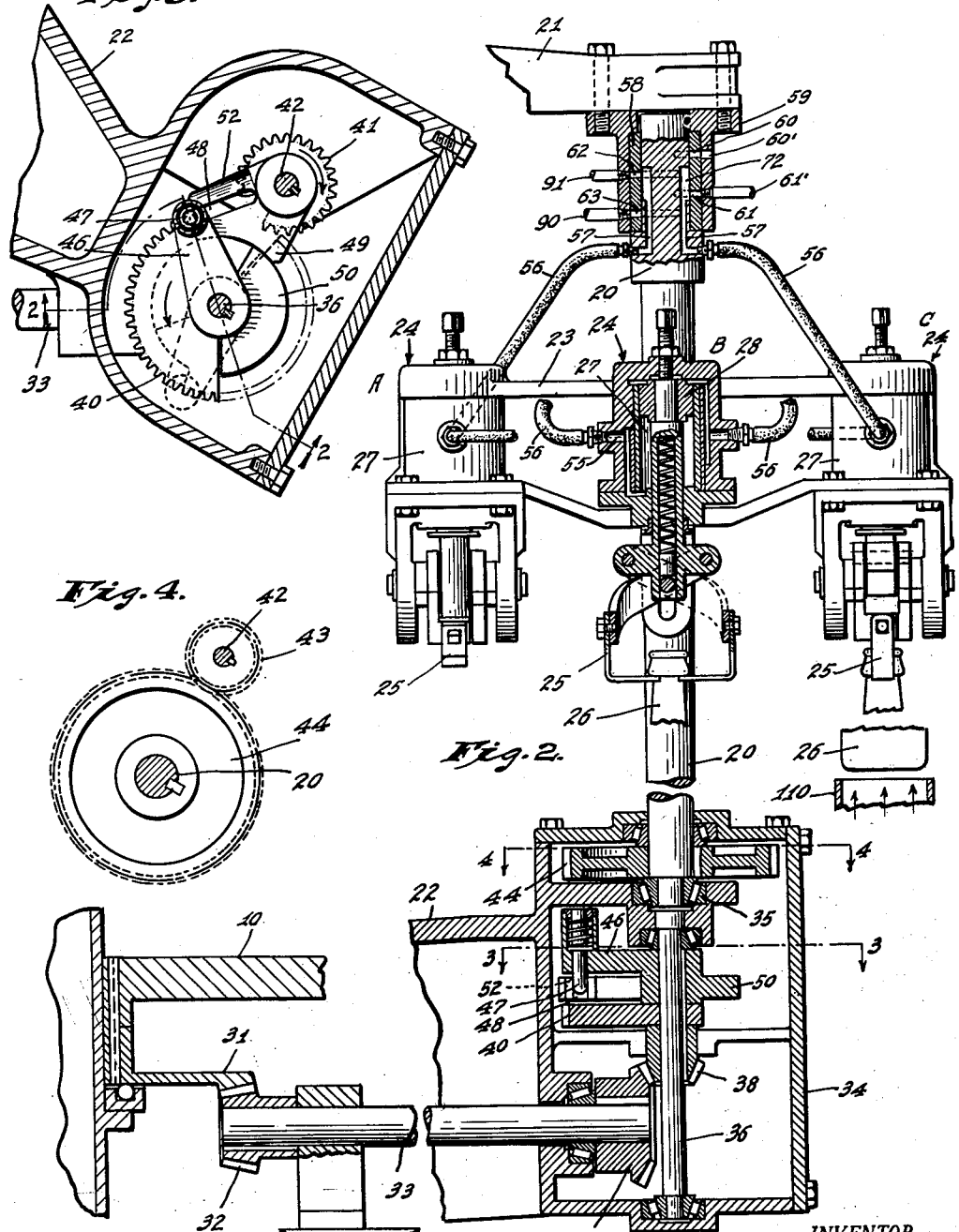
INVENTOR.
JOHN L. WOOLLING,
BY
ATTORNEYS.

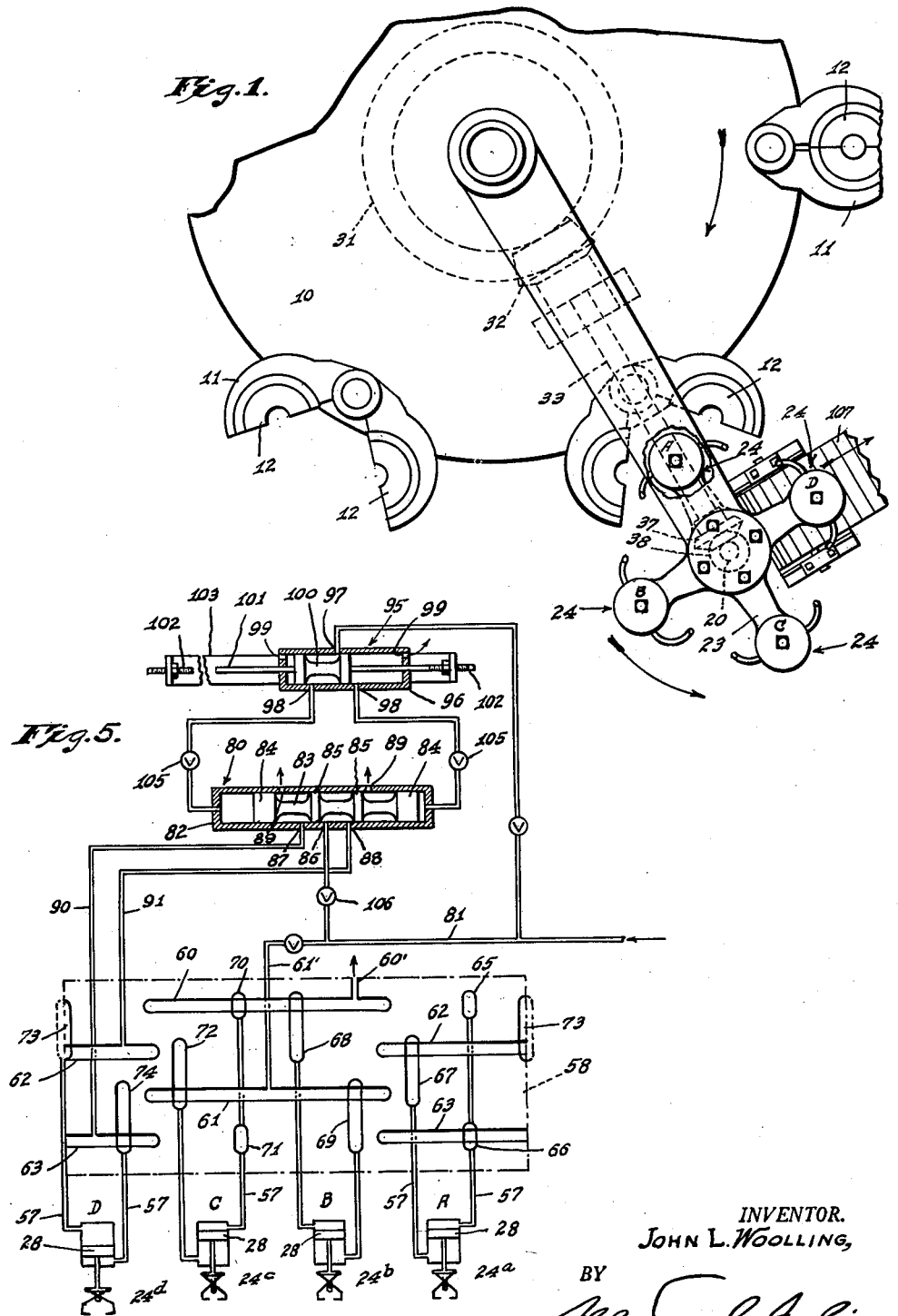

Patented Apr. 14, 1953

2,634,552

UNITED STATES PATENT OFFICE 2,634,552

TAKE-OUT DEVICE FOR GLASS BLOWING MACHINES

John L. Woolling, Indianapolis, Ind., assignor to Fairmount Glass Works, Inc., Indianapolis, Ind., a corporation Application January 10, 1949, Serial No. 70,083

5 Claims. (Cl. 49—14)

This invention relates to machines of the type employed in the making of glass bottles, and more particularly to the transfer device employed in removing the finished bottle or other article from such machines. In a common form of glass-bottle making machine, a rotatable mold table carries an annular series of molds and rotates intermittently to bring the finished bottles to a take-out position at which each bottle is removed from association with the mold and usually transferred to a conveyor. A common form of transfer device embodies a pair of jointly movable bottle-supporting heads supported in diametrically opposite positions from a shaft which is geared to the mold table to rotate through one-half revolution when the mold table indexes through the angle necessary to bring a new mold to the take-out station. During each half-revolution of the shaft, one head carries a finished bottle from the take-out station to a discharge station associated with the conveyor while the other head moves from the discharge station to the take-out station preparatory to gripping the next finished bottle. As a result, the maximum period during which a bottle is supported by the transfer mechanism is necessarily somewhat less than the interval between successive indexing movements of the mold table.

The transfer device is a factor limiting the speed of operation of the bottle-making machine; because, if the machine operates too rapidly, the bottle will be set down upon the conveyor before it has cooled sufficiently to be able to support its own weight without change of shape.

It is the object of this invention to produce an improved transfer device which will enable a bottle-making machine to be operated at speeds greater than those heretofore practicable. A further object of the invention is to produce such a transfer device which will not require extensive changes in the construction of the machine as a whole. Still another object of the invention is to provide an improved means for operating bottle-supporting heads of a transfer device.

In carrying out the invention in its preferred form, I provide the transfer mechanism with more than two heads, and preferably with four heads; and I operate such transfer mechanism so that each bottle will be supported thereby for a time interval greater than that between two successive indexing movements of the mold table.

The accompanying drawings illustrate the invention: Fig. 1 is a fragmental plan view, somewhat diagrammatic in character, illustrating a portion of the mold table and the associated transfer mechanism; Fig. 2 is an elevation of the transfer mechanism and its associated drive, the latter being indicated in section generally on the line 2—2 of Fig. 3; Fig. 3 is a fragmental horizontal section on the line 3—3 of Fig. 2; Fig. 4 is a section on the line 4—4 of Fig. 2; and Fig. 5 is a diagrammatic development illustrating the automatic controls employed in the pneumatic operation of the bottle-supporting heads of the transfer mechanism.

In the machine as illustrated in Fig. 1, a mold table 10 supports an annular series of mold hangers 11 each of which contains a divided bottle mold 12. Means (not shown) of known form are provided for rotating the table 10 intermittently through an angle equal to the angle between successive mold hangers 11, whereby the molds are moved successively through a series of stations at which various operations are performed and finally to a take-out station and into association with a transfer mechanism by which the finished bottles are removed from the machine.

The transfer mechanism shown in the drawing comprises a vertical shaft 20 rotatably supported at one side of the mold table from upper and lower arms 21 and 22 which project outwardly from the frame of the machine. Intermediate its length, the shaft 20 has secured to it a spider 23 having at least three, and preferably four, arms each of which supports at its outer end a bottle-carrying head designated generally by the reference numeral 24. Each of such heads comprises a bottle-clamp 25 adapted, as shown in Fig. 2, to grip the neck of a bottle 26. Each head also embodies mechanism, shown as pneumatic in character, for automatically operating the clamp 25. Each such mechanism may embody a cylinder 27 and a piston 28 reciprocable therein and operatively connected to the clamp 25. In the particular pneumatic mechanism shown, which is of a type in common use, each cylinder 27 is arranged vertically, and the piston 28 moves upwardly to close the clamp 25 and downwardly to open it. The shaft 20 is operated jointly with the mold table 10 so as to rotate intermittently and bring the several heads 24 successively into association with the mold table at the take-out station thereof.

A preferred means for operating the shaft 20 is illustrated in Figs. 2, 3, and 4. As there shown, the bottle-making machine embodies a bevel gear 31 rigid with the mold table 10 and meshing with a bevel pinion 32 secured to a shaft 33 which extends radially of the mold table. The outer end of the shaft 33 extends into a housing 34 supported from the arm 22 and in which a bearing 35 for the lower end of the shaft 20 is provided. Supported in the housing 34 in alignment with the shaft 20 is an auxiliary shaft 36 operatively connected to the shaft 33 as through bevel gearing 37—38. Rigidly secured to the shaft 36 I provide a gear-sector 40 adapted to mesh with a pinion-sector 41 secured to a vertical countershaft 42 which carries, at its upper end, a pinion 43 meshing with a gear 44 secured to the lower end of the shaft 20.

Above the gear-sector 40, the shaft 36 carries an arm 46 bearing at its outer end a pin 47 receivable in a generally radial slot 48 provided in a member 49 secured to the countershaft 42. The arm 46 has integral with it a disk-sector 50 which, as shown in Fig. 3, co-operates with an arcuate surface on the member 49 to prevent rotation of such member about the axis of the shaft 42 so long as it is engaged with the disk-sector 50.

The shafts 36 and 42 rotate respectively in the directions indicated by the arrows shown in Fig. 3. The pin 47 is located adjacent the trailing end of the gear-sector 40 and approximately on the pitch-line thereof; while the plane of the slot 48 is approximately coincident with the trailing end of the pinion 41. For a purpose which will hereinafter become apparent, the pin 47 is slidably supported in the arm 46 and resiliently urged downwardly into the plane of the member 49, and the leading edge of such member 49 is provided with an upwardly and rearwardly inclined cam face 52.

The effective ratios of the various gears illustrated in the drawing will vary with the number of heads 24 embodied in the transfer mechanism and with the number of mold-hangers 11 on the table 10. In the particular machine shown, there are four of the heads 24 equally spaced about the axis of the shaft 20 and six mold-hangers 11 spaced at equal angular intervals about the axis of the mold table 10. It is accordingly desired that the shaft 20 rotate through 90° (the interval between adjacent heads 24) while the mold table 10 rotates through 60° (the interval between adjacent mold hangers 11). To effect this result, the ratio of the gears 31 and 32 is 3:1, that of the gears 37 and 38 is 2:1 and that of the gears 43 and 44 is 1:4. The ratio of the gear-sectors 40 and 41 is 2:1, the angular extent of the sector 40 is somewhat less than 180°, and the angular extent of the sector 41 is twice that of the sector 40.

The parts of the driving mechanism of the transfer device are shown in Fig. 3 in the positions they occupy at the instant the shaft 20 comes to rest. This event occurs during indexing movement of the mold table 10; and during the remainder of such mold-table movement the shaft 36 and sector 40 continue to rotate, while the member 49 and shaft 42 remain at rest, until the sector 40 is almost in engagement with the sector 41, which position is indicated in dotted lines in Fig. 3. When the mold table begins its next indexing movement, the sector 40 immediately engages the sector 41 to cause it to rotate, the disk-sector 50 having at this time moved far enough so that it will not interfere with movement of the arm 49.

So long as the gear-sectors 40 and 41 remain in engagement with each other, the shaft 42 rotates at an angular velocity equal to twice that of the shaft 36. However, when the trailing edges of the sectors 40 and 41 reach the line of centers of the shafts 36 and 42, continued rotation of the shaft 42 is produced by engagement of the pin 47 in the slot 48. As the pin 47 is located substantially on the pitch line of the gear-sector 40, the transfer of the driving effort from the gear-sectors to the pin-and-slot connection is accompanied by no abrupt change in velocity; but as the arm 46 continues to rotate, the velocity of the shaft 42 gradually decreases, such shaft coming to rest when the arm 46 attains the position shown in Fig. 3. As the pin 47 and the slot 48 approach aligned relationship, the angular velocity of the member 49 is greater than that of the pin, with the result that the inclined cam face 52 forces the pin 47 upwardly to be supported by the member 49 until the slot and pin come into alignment, whereupon the pin moves downwardly into the slot.

Because of the gear ratios above set forth, the shafts 36 and 42 make one revolution for each indexing movement of the mold table 10, while the gear 44 and shaft 20 rotate through one-fourth revolution for each indexing movement of the mold table. As there are four equally spaced heads 24, each indexing movement of the mold table 10 causes a new head 24 to be brought into association with the mold at the take-out station of the mold table.

In the common form of transfer device employed prior to my invention, the shaft 20 supported two heads 24 spaced equally about the shaft-axis, the shaft 20 was directly connected to the shaft 33 by miter (1:1) gears, and the shaft 33 was connected to the mold table by the same gears as those illustrated in the drawings in this application. As a result, the shafts 20 rotated 180° for each indexing movement of the mold table, carried one head and a bottle clamped thereby from a mold on the table to discharge position, and brought the other head 24 into association with the next succeeding mold on the mold table. The distance between each head 24 and the axis of the shaft 20 was such that the bottle-carrying head moved out of association with the mold table at a velocity sufficient to prevent the open mold from striking the suspended bottle.

By my invention, I am enabled to mount the shaft 20 in the same position in respect to the mold table as it occupied in the common form of two-head take-out device. Although each head is mounted the same distance from the shaft-axis and moves through only 90° instead of through 180° at each indexing movement of the mold table, its angular velocity through all but the final portion of its movement is great enough to prevent the bottle it carries from being struck by the open mold on the moving mold table. In fact, except for the final portion of each indexing movement, each head 24 of my device moves with the same angular velocity as if the shaft 20 were connected to the mold table at the 3:1 speed ratio employed in the old type transfer device.

The pneumatically operated clamping mechanism embodied in each of the heads 24 is conveniently controlled by rotation of the shaft 20 in co-operation with certain valving mechanism operated with the mold table 10, in a manner now to be described. Opposite ends of each cylinder 27 communicate respectively with openings 55 connected by conduits 56 to axially extending passages 57 provided in the shaft 20. Adjacent the upper end of the shaft 20, the passages 57 communicate with ports which, in the rotation of the shaft 20, co-operate with other ports formed in a stationary bushing 58 into which the upper end of the shaft 20 extends, such bushing being supported in a bearing block 59 attached to the outer end of the arm 21.

The arrangement of the ports in the shaft 20 and bushing 58 is indicated diagrammatically in Fig. 5, which figure constitutes a schematic development of the engaging surfaces of the shaft and bushing as rolled out into a plane in such a manner that the shaft-ports would move from right to left over the bushing-ports as the shaft rotates. The ports in the bushing 58 include a pair of axially spaced, circumferentially co-extensive ports 60 and 61 and a second pair of ports 62 and 63 circumferentially co-extensive with and axially spaced from each other. Each pair of ports is slightly more than 180° in extent, and the ports of each pair circumferentially overlap the ports of the other pair to a slight extent.

The upper end of the cylinder 27 of one of the heads 24, designated for convenience as 24a in Fig. 5, communicates with a pair of ports 65 and 66 which are formed in the shaft 20 in the respective planes of the bushing-ports 60 and 63; and the lower end of such cylinder communicates with a shaft-port 67 possessing sufficient axial extent to overlap the bushing-ports 61 and 62. The cylinder of the next adjacent head 24b in the direction of rotation of the shaft 20 has its upper end connected to a shaft-port 68 overlapping the planes of the ports 60 and 62 and its lower end connected to a shaft-port 69 overlapping the planes of the bushing-ports 61 and 63. The cylinder of the next head 24c has its upper end connected to a pair of shaft-ports 70 and 71 located respectively in the planes of the bushing-ports 60 and 63, while its lower end is connected to a shaft-port 72 which overlaps the planes of the bushing-ports 61 and 62. The cylinder of the remaining head 27d has its upper end connected to a shaft-port 73 which overlaps the planes of the bushing-ports 60 and 62 and its lower end connected to a port 74 which overlaps the bushing-ports 61 and 63. A duplicated showing of the port 73 appears in dotted lines at the right of Fig. 5 to indicate circumferential continuity.

The valving function performed by the shaft-ports and the bushing-ports as the shaft 20 rotates is supplemented by a delay valve 80. Such valve, which may be pneumatically operated, is a four-way valve serving alternatively to connect either of the bushing-ports 62 and 63 to a supply line 81 extending from a source of fluid under pressure while connecting the other of the bushing-ports to exhaust. If air is employed as the fluid under pressure, the valve 80 may exhaust to atmosphere.

The valve 80 comprises a cylinder 82 which slidably receives a valve piston 83, such piston comprising end lands 84, which serve as piston heads, and intermediate valving lands 85. The cylinder 82 is provided with an inlet port 86, control ports 87 and 88, and exhaust ports 89. The control ports 87 and 88 are connected respectively to the bushing-ports 63 and 62 through conduits 90 and 91. The arrangement of the ports in the cylinder and of the lands 85 on the reciprocable valve member 83 is such that by moving the valve member either of the bushing-ports 62 and 63 can be connected to the supply line 81 while the other is connected to atmosphere.

To control the valve 80 a pilot valve 95 may be employed. Such valve is a four-way valve operable alternatively to connect either end of the cylinder 82 of the valve 80 to the supply line 81 and the other end of such cylinder to exhaust. As shown, the valve 95 comprises a cylinder 96 provided with an inlet port 97, control ports 98, and exhaust ports 99. Within the cylinder, there is reciprocably mounted a valving element 100 which can be moved in one direction to connect one of the control ports 98 to the supply line 81 and the other port 98 to an exhaust port 99, and in the opposite direction to reverse the connections.

To operate the valve 95, the valve element 100 is provided with a rod or stem 101 which projects outwardly through opposite ends of the cylinder 96 for co-operation with abutments 102 adjustably mounted on a reciprocable element 103. The reciprocable element 103 may form part of or may be connected to the mechanism employed for indexing the mold table 10, the arrangement being such that the member 103 moves in one direction during one indexing movement of the mold table and in the opposite direction during the next succeeding indexing movement of the mold table.

The function of the valve 80 is to delay any change in condition of the pneumatically controlled heads 24 until after the mold table 10 and the shaft 20 have come to rest following an indexing movement. Shifting of the valve member 100 of the pilot valve 95 takes place during the last stage of indexing movement of the mold table 10, and the valving element 83 of the delay valve 80 will not move to its new position until after the valve member 100 of the pilot valve has been shifted. The duration of the delay which the valve 80 provides can be modified if desired by adjustment of valves 105 interposed in the connections between the ports 98 of the pilot valve and the ends of the delay-valve cylinder 82. Response of the heads 24 to a new position of the delay valve 80 may be controlled by a valve 106 interposed between the supply line 81 and the inlet port 86 of such valve.

The respective positions of the various parts indicated in Fig. 5 are those existing when the mold table 10 is at rest following an indexing movement in which the reciprocating member 103 moved to the left. The valve member 100 of the valve 95 has been moved to the left as a result of engagement of the valve stem 101 with the right-hand abutment 102, with the result that the left-hand end of the cylinder 82 of valve 80 is connected to the supply line 81 while the right-hand end of the cylinder 82 is connected to atmosphere. Fluid pressure in the left-hand end of the cylinder 82 has displaced the valve element 83 therein to the right, the supply line 81 is connected to the bushing-port 62, and the bushing-ports 63 is connected to atmosphere. Of the other two bushing-ports, the upper bushing-port 60 is permanently connected to atmosphere, as through a passage 60', and the port 61 is connected to the supply line 81 through a conduit 61'. As a result of the connections thus existing, fluid-pressure acting on the several pistons holds the clamps 25 of the heads 24a, 24b, and 24c closed and the clamp of head 24d open.

Referring to Fig. 1, it will be noted that the four stations through which the heads 24 successively pass in a complete rotation of the shaft 20 are designated by the reference letters A, B, C, and D, station A being the station at which the finished bottle is picked up from a mold on the table 10 and station D being the station at which the bottle is deposited, as on to a conveyor 107. In Fig. 5, the several stations of the transfer device are correspondingly designated.

The next indexing movement of the shaft 20 will carry the head 24a to station B, head 24b to station C, head 24c to station D, and head 24d to station A. During this movement, the valve 80 remains in the condition illustrated in Fig. 5, the bushing-port 62 remains connected to the supply line 81, and the bushing-port 63 remains in communication with atmosphere. Accordingly, movement of the shaft-ports of head 24c into association with the bushing-ports 62 and 63 and movement of the shaft-ports of head 24a into association with the bushing-ports 60 and 61 will produce no change in the effective connections, and the clamps 25 of those two heads will consequently remain closed. The shaft-ports 68 and 69 of the head 24b remain in association with the bushing-ports 60 and 61, while the shaft-ports 73 and 74 of the head 24d remain in association with the bushing-ports 62 and 63, with the result that the clamp 25 of head 24b remains closed and the clamp 25 of head 24d remains open. At the conclusion of this indexing movement, the member 103 reverses the pilot valve 95 which, in turn, reverses the delay valve and the connections of the bushing-ports 62 and 63. As a result, the clamp of head 24d, now at station A, closes to grip the finished bottle at the discharge station of the mold table and the clamp of head 24c at station D opens to deposit on the conveyor 107 the bottle it previously carried. Reversal of the valve 80 is without effect on the heads 24a and 24b, respectively at stations B and C, because the bushing-ports 60 and 61 are permanently connected to atmosphere and to the supply line 81, respectively.

The next succeeding indexing movement carries the head 24a to station C, head 24b to station D, head 24c to station A, and head 24d to station B. During this step, the valves 95 and 80 remain in reversed condition, bushing-port 62 remains in communication with atmosphere, and bushing-port 63 remains connected to supply line 81. In consequence, movement of the ports of head 24b into association with bushing-ports 62 and 63 and movement of the ports of head 24d into association with bushing-ports 60 and 61 will produce no change in the effective connections, and the clamps of the heads 24b and 24d will remain closed. The shaft-ports of the head 24a remain in association with the bushing-ports 60 and 61, with the result that the clamp of head 24a remains closed. The ports of head 24c remain in association with bushing-ports 62 and 63, and the clamp of that head therefore remains open. At the conclusion of the indexing step, the member 103 restores the valve 95 to the condition shown in Fig. 5, thus causing the delay valve 80 and the connections of the bushing-ports 62 and 63 to be reversed. As a result, the clamp of head 24c, now at station A, closes on a finished bottle, while the clamp of head 24b at station D opens and deposits on the conveyor 107 the bottle it previously supported.

As the shaft-ports of the heads 24a and 24c are positioned axially in the same manner, during the third and fourth indexing movements the head 24c duplicates the movements and functions which the head 24a performed during the first and second indexing movements. Similarly, the head 24a, during the third and fourth indexing movements, duplicates the movements and functions performed by the head 24c in the first and second indexing movements. The shaft-ports of the heads 24b and 24d are also similarly axially arranged, and each of those heads therefore duplicates during the third and fourth indexing movements the movements and functions performed by the other in the first and second indexing movements.

From the above, it will be apparent that after each head 24 reaches station A its clamp closes on the finished bottle, supports the bottle during the next three indexing movements, and then deposits the bottle on the conveyor 107 at station D. During its travel from station A through stations B and C to station D, the bottle is cooling and becoming more rigid. To expedite the cooling of bottles suspended from the clamps 25 cooling air may be directed against them, and the means for discharging such air may include upwardly discharging conduits arranged at stations B and C to direct air against the bottles at those stations. One such conduit is indicated at 110 in Fig. 2.

The peculiar character of the motion imparted to the shaft 20 by its driving mechanism has an especial advantage when bottle-cooling means including one or more of the conduits 110 are provided. Driving mechanism having the proportions shown in the drawing moves each head 24, at a velocity which bears a constant ratio to that of the mold table, through an angle of approximately 70°, and then gradually reduces such velocity to zero during the next 20° of head-movement. The 70° of head-movement is accomplished by about one-half a revolution of the shaft 36 and hence is fully or substantially completed during the first half of the interval required for an indexing movement of the mold table. A movement of 70° is generally sufficient to carry a bottle at station A or B into association with a blast of cooling air from a conduit 110 at station B or C; and by shortening the interval required to move a bottle into association with the cooling air, I increase the duration of each period in which the bottle is subjected to cooling air and hence expedite cooling of the bottle. Moreover, if it is desired to perform some supplementary operation, such as fire-polishing, on the bottles as they are held stationary at stations along the path of the heads 24, the rapid movement of the bottles from station to station increases the time available for the supplementary operation.

During the first part of an indexing movement, with a bottle at the take-out station supported from a head 24, moving with such head, but still disposed within the opened mold, it is necessary that the bottle and mold move with approximately the same linear velocity if interference between them is to be avoided. If the head-supporting shaft 20 were geared to the mold table at a constant ratio, such ratio would necessarily be fixed by the relation between the number of molds on the mold table and the number of heads on the take-out device; and, as will be obvious, the required equality of linear velocities could be obtained only by properly proportioning the ratio of the effective diameters of the mold table and take-out device. Specifically, if the take-out shaft 20 were to be driven from the mold table through constant-ratio gearing, an increase in the number of take-out heads would require a corresponding increase in their distance from the axis of the shaft 20. My invention makes the spacing of the heads 24 from the axis of the shaft 20 independent of the number of heads.

While I have shown my invention as embodied in a bottle-making machine provided with a take-out device in which there are four bottle-supporting heads and in which the bottle is deposited by the take-out mechanism at the end of three indexing movements, it is to be understood that the invention is not limited to that specific arrangement. If the interval required for two indexing movements is sufficient to cool the bottle to the desired extent, the porting arrangement at the upper end of the shaft 20 could be modified to effect deposit of the bottle at station C, or after two indexing movements. Further, I might employ a number of heads 24 other than four, and still obtain the benefits of the invention. For any given number of heads, driving mechanism which rotates those heads first at a relatively high velocity until the mold table is cleared and then at gradually decreasing velocity permits the heads to be mounted closer to the axis about which they rotate, and hence permits the overall dimensions of the bottle-making machine to be reduced.

I claim as my invention:

1. In a machine of the type described, a mold table intermittently rotatable in equal angular movements, a take-out device for removing finished articles from said mold table and comprising a shaft supported at one side of the mold table, an annular series of article-supporting heads supported from said shaft, said shaft being rotatable in steps to carry each head successively from a take-out position in association with the mold table through at least one intermediate position to a discharge position, each head coming to rest in one of said positions at the conclusion of each rotative step mechanism driven jointly with the mold table for rotating said shaft through a complete step during only a portion of a movement of the mold table, and means for operating said heads to cause each head to clamp an article as it reaches the take-out position, and to release such article as it reaches the discharge position.

2. The invention set forth in claim 1 with the addition of article-cooling means for cooling the articles supported by a head in an intermediate position.

3. In a machine of the type described, an intermittently rotatable mold table, a take-out device for removing finished articles from said mold table and comprising a shaft supported at one side of the mold table, a plurality of article-supporting heads supported from said shaft and spaced at equal angular intervals about the axis thereof, said shaft being rotatable in steps to carry each head from a take-out position in association with the mold table to a discharge position, a rotatable element operatively connected to the mold table to rotate when and only when the mold table moves, mechanism driven by said element and operative during a first portion of each partial rotation of the mold table for rotating said shaft at relatively high velocity through a fraction of the angular interval between adjacent heads, mechanism driven from said element and operative during a later portion of the partial revolution of the mold table for rotating the shaft at a gradually decreasing velocity through the balance of such angular interval, and means operative to cause a head at the take-out position to clamp an article on the mold table and a head at the discharge position to release the bottle associated with it.

4. In a machine of the type described, an intermittently rotatable mold table, a take-out device for removing finished articles from said mold table and comprising a shaft supported at one side of the mold table, a plurality of article-supporting heads supported from said shaft, means operative at each movement of the mold table for bringing one of said heads into association with the mold table and another into a discharge position, said means comprising a driven shaft disposed in alignment with said head-supporting shaft and operatively connected to the mold table to rotate through a complete revolution at each partial revolution of the mold table, means operative during a first portion only of each revolution of the driven shaft for rotating the head-supporting shaft to move one of the heads into a take-out position in association with the mold table and another head into a discharge position, and means for operating the head at the take-out position to cause it to clamp an article on the mold table and the head at the discharge position to release the bottle associated with it.

5. In a machine of the type described, an intermittently rotatable mold table, a take-out device for removing finished articles from said mold table and comprising a shaft supported at one side of the mold table, a plurality of article-supporting heads supported from said shaft, means operative at each movement of the mold table for bringing one of said heads into association with the mold table and another into a discharge position, said means comprising a driven shaft operatively connected to said mold table at a constant velocity ratio, a countershaft operatively connected to said head-supporting shaft, first and second meshing gear sectors mounted respectively on said driven shaft and countershaft, a member rigidly mounted on said countershaft and provided with a generally radial slot, a pin supported from and rotatable with said driven shaft, said pin and slot being so arranged that as the gear sectors move out of engagement with each other the pin will enter into driving engagement with the slot, and means operative to cause the head in association with the mold table to clamp an article thereon and the head at the discharging position to release the article associated with it.

JOHN L. WOOLLING.

References Cited in the file of this patent

UNITED STATES PATENTS

| Number | Name | Date |
| --- | --- | --- |
| 316,314 | Von Martini | Apr. 21, 1885 |
| 805,876 | O'Neill | Nov. 28, 1905 |
| 820,478 | Croskey | May 15, 1906 |
| 1,165,378 | Allison et al. | Dec. 28, 1915 |
| 1,590,558 | Stenhouse | June 29, 1926 |
| 1,596,733 | Higgins | Aug. 17, 1926 |
| 1,619,729 | Howard | Mar. 1, 1927 |
| 1,808,689 | Stenhouse et al. | June 2, 1931 |
| 1,894,576 | Tremblay | Jan. 17, 1933 |
| 1,935,739 | Freese | Nov. 21, 1933 |
| 2,198,543 | Lauterbach | Apr. 23, 1940 |
| 2,229,993 | Weightman | Jan. 28, 1941 |
| 2,384,498 | Sloan | Sept. 11, 1945 |